United States Patent
Tsutsui

(10) Patent No.: US 11,213,742 B2
(45) Date of Patent: Jan. 4, 2022

(54) GAMING MACHINE CONTROLLER AND METHOD OF USE

(71) Applicant: Yuichiro Tsutsui, Tsutsui (JP)

(72) Inventor: Yuichiro Tsutsui, Tsutsui (JP)

( * ) Notice: Subject to any disclaimer, the term of this patent is extended or adjusted under 35 U.S.C. 154(b) by 0 days.

(21) Appl. No.: 15/716,465

(22) Filed: Sep. 26, 2017

(65) Prior Publication Data

US 2018/0085667 A1 Mar. 29, 2018

Related U.S. Application Data

(60) Provisional application No. 62/400,573, filed on Sep. 27, 2016.

(51) Int. Cl.
| | |
|---|---|
| *A63F 13/327* | (2014.01) |
| *G07F 17/32* | (2006.01) |
| *A63F 13/25* | (2014.01) |
| *A63F 13/35* | (2014.01) |
| *A63F 13/92* | (2014.01) |
| *G07F 17/34* | (2006.01) |

(52) U.S. Cl.
CPC ............ *A63F 13/327* (2014.09); *A63F 13/25* (2014.09); *A63F 13/35* (2014.09); *A63F 13/92* (2014.09); *G07F 17/3213* (2013.01); *G07F 17/3218* (2013.01); *G07F 17/3223* (2013.01); *G07F 17/3225* (2013.01); *G07F 17/34* (2013.01)

(58) Field of Classification Search
CPC .... A63F 13/327; A63F 13/92; G07F 17/3218; G07F 17/3223; G07F 17/3225
See application file for complete search history.

(56) References Cited

U.S. PATENT DOCUMENTS

| | | | | |
|---|---|---|---|---|
| 8,469,800 | B2 * | 6/2013 | LeMay | G07F 17/3223 463/16 |
| 8,613,659 | B2 * | 12/2013 | Nelson | G07F 17/3223 463/25 |
| 9,153,095 | B2 * | 10/2015 | Adiraju | G07F 17/3223 |
| 9,852,578 | B2 * | 12/2017 | Nelson | G07F 17/32 |
| 10,395,465 | B2 * | 8/2019 | Bytnar | H04W 12/06 |
| 2003/0064805 | A1 * | 4/2003 | Wells | G07F 17/32 463/39 |
| 2006/0025222 | A1 * | 2/2006 | Sekine | G07F 17/32 463/42 |

(Continued)

*Primary Examiner* — Seng H Lim
(74) *Attorney, Agent, or Firm* — Allen D. Hertz, P.A.; Allen D. Hertz

(57) ABSTRACT

An application enabling a player to utilize a portable computing device, such as a Smartphone, to function as a game controller for a gaming machine. The user would receive and return an associating link code to initiate a communication link between the gaming machine and the portable computing device by way of tapping, manually entering the code, or scanning an image of the code. The portable computing device enables manual user input or use of motion controllers for controlling skill based games in a casino environment. The application can receive a configuration from the gaming machine to replicate or mimic the controls and the gaming images, thus enabling the player to play the game at a short distance from the machine. The gaming machine can suspend play or terminate play when the portable computing device becomes distant or disconnected from the gaming machine.

25 Claims, 8 Drawing Sheets

(56) References Cited

U.S. PATENT DOCUMENTS

| | | | |
|---|---|---|---|
| 2006/0189382 A1* | 8/2006 | Muir | G07F 17/3232 463/29 |
| 2007/0021198 A1* | 1/2007 | Muir | G07F 17/3262 463/29 |
| 2011/0065496 A1* | 3/2011 | Gagner | G07F 17/3209 463/25 |
| 2011/0207531 A1* | 8/2011 | Gagner | G07F 17/3248 463/30 |
| 2012/0015735 A1* | 1/2012 | Abouchar | G07F 17/3225 463/42 |
| 2012/0190455 A1* | 7/2012 | Briggs | A63F 13/332 463/42 |
| 2013/0023339 A1* | 1/2013 | Davis | G06Q 20/3276 463/29 |
| 2013/0053136 A1* | 2/2013 | LeMay | G07F 17/32 463/29 |
| 2013/0130777 A1* | 5/2013 | Lemay | G07F 17/34 463/25 |
| 2013/0130786 A1* | 5/2013 | Robbins | G07F 17/3244 463/25 |
| 2013/0165199 A1* | 6/2013 | Lemay | G07F 17/3218 463/20 |
| 2013/0165231 A1* | 6/2013 | Nelson | A63F 13/5375 463/42 |
| 2013/0165232 A1* | 6/2013 | Nelson | G07F 17/3255 463/42 |
| 2013/0167208 A1 | 6/2013 | Shi | |
| 2013/0203489 A1* | 8/2013 | Lyons | G07F 17/3225 463/30 |
| 2013/0281207 A1* | 10/2013 | Lyons | G07F 17/3211 463/33 |
| 2013/0303263 A1* | 11/2013 | LeMay | G07F 17/3225 463/25 |
| 2013/0310159 A1* | 11/2013 | Froy | G07F 17/3218 463/25 |
| 2013/0324237 A1* | 12/2013 | Adiraju | G07F 17/3237 463/29 |
| 2014/0018153 A1 | 1/2014 | Nelson | |
| 2014/0094272 A1* | 4/2014 | Kelly | G07F 17/3225 463/25 |
| 2014/0141864 A1* | 5/2014 | Ward | G07F 17/34 463/25 |
| 2014/0200065 A1* | 7/2014 | Anderson | G07F 17/3209 463/20 |
| 2015/0087369 A1* | 3/2015 | McIntyre | G07F 17/3225 463/11 |
| 2015/0228153 A1* | 8/2015 | Hedrick | G07F 17/3225 463/25 |
| 2015/0325077 A1 | 11/2015 | Lyons | |
| 2016/0014545 A1* | 1/2016 | Tian | H04W 4/80 455/41.2 |
| 2016/0027244 A1* | 1/2016 | Adiraju | G07F 17/3237 463/25 |
| 2016/0027249 A1* | 1/2016 | Nelson | G07F 17/32 463/29 |
| 2016/0093166 A1* | 3/2016 | Panambur | G06Q 20/3278 463/25 |

* cited by examiner

GAMING MACHINE CONTROLLER AND METHOD OF USE

CROSS-REFERENCE TO RELATED APPLICATION

This Application is a Non-Provisional Patent Application which claims the benefit of U.S. Provisional Patent Application Ser. No. 62/400,573, filed on Sep. 27, 2016, which is incorporated in its entirety by reference herein.

FIELD OF THE INVENTION

The present invention relates to a gaming machine controller. More specifically, the present invention relates to a use of a portable computing device, such as a Smartphone, a portable computing tablet, and the like, as a gaming machine controller.

BACKGROUND OF THE INVENTION

Gaming machines, such as slot machines, automated table game machines, and the like are controller by user input devices that are integrated into the machine. In a second example, slot machines include a slot machine arm to spin the wheels. In a second example, automated table game machines include a series of buttons or other input components to instruct the machine on how the player desires to play the game.

The use of user input components that are integrated into the gaming machine limit the user's position respective to the machine. This restricts the player to a certain positions respective to the machine. Commonly, the player sits upon a stool in front of the machine. The player interacts with user input components, such as buttons on a front shelf of the gaming machine and/or a slot machine arm, commonly located on a right side of the gaming machine. This can be uncomfortable for certain players, such as players that are handicapped, players with back issues, players with shoulder issues, and the like.

Accordingly, there remains a need in the art for a process to enable flexibility for the methods where a player provides inputs to a gaming machine.

SUMMARY OF THE INVENTION

The present invention overcomes the deficiencies of the known art by disclosing a system and a method for establishing a communication link between a gaming machine and a portable computing device, wherein the link enables a gaming controller application operating on the portable computing device to provide instructions to the gaming machine to play a game thereon.

In accordance with one embodiment of the present invention, the invention consists of a system and a method using a gaming machine controller Application, the method comprising steps of:
  installing a gaming controller application onto a portable computing device;
  activating the gaming controller application;
  establishing a short range, wireless communication link between a gaming machine and the portable computing device; and
  utilizing the gaming controller application to provide instructions to the gaming machine to play a game thereon.

In a second aspect, the method further comprises a step of tapping the portable computing device against a hot spot located on the gaming machine to initiate the step of establishing a short range, wireless communication link between a gaming machine and the portable computing device.

In another aspect, the portable electronic device is a Smartphone.

In yet another aspect, the portable electronic device is a portable computing tablet.

In yet another aspect, the tapping process is accomplished by waving the portable computing device across a hot spot on the gaming machine.

In yet another aspect, the tapping process includes a step of obtaining identifying information associated with the portable computing device.

In yet another aspect, the step of creating a short range link is accomplished utilizing an associating link code obtained from the gaming machine.

In yet another aspect, the associating link code is randomly generated by the gaming machine, a server, or any other suitable computing device. The randomly generated associating link code ensures security respective to the process of creating a link between the gaming machine and the portable computing device. The use of a randomly generated associating link code ensures against a different player entering a known associating link code, where the different player could possibly interfere with or even hijack play on the respective gaming machine.

In yet another aspect, the associating link code is generated by the gaming machine, a server, or any other suitable computing device using information provided by and/or associated with the specific gaming machine.

In yet another aspect, the associating link code is obtained from the gaming machine by reading a human readable presentation of the associating link code.

In yet another aspect, the associating link code is obtained from the gaming machine by scanning a machine readable presentation of the associating link code. Examples of machine readable configurations include any suitable barcode, any suitable Quick Read (QR) code, and the like. The machine readable presentation would be presented upon a display integrated into the gaming machine. The displayed image of the machine readable presentation can be a presented in a dedicated display, the gaming display, or any other suitable shared display located on or proximate the gaming machine.

In yet another aspect, the associating link code is obtained from the gaming machine by scanning a machine readable presentation of the associating link code using a digital image acquisition device (camera) integrated within the portable computing device or Smartphone.

In yet another aspect, the associating link code is obtained using a scanning process employed by an application operating on the portable computing device or Smartphone.

Upon acquisition of the scanned associating link code, the application operating on the portable computing device or Smartphone can request an action from the user or automatically respond to a recipient. The recipient can be a central gaming server, the respective gaming machine, both, or any other suitable recipient.

In yet another aspect, the associating link code is obtained from the gaming machine by scanning a machine readable image comprising a link to a domain and the associating link code. This can be referred to as an embedded associating link code. An exemplary format of the decoded machine readable image is: "https://www.domain.com/ example.html?id=example1"; wherein "www.domain.com" identifies the domain, "example.html" identifies the associated webpage, and "?id=example1" provides the unique identifier associated with the specific request to establish a link between the gaming machine and the portable computing device or Smartphone. The associated webpage would include instructions to decode the unique identifier associated with the specific request, determine which machine is involved, validate the request, and establish a secured link between the gaming machine and the portable computing device or Smartphone.

In yet another aspect, the associating link code can be predefined.

In yet another aspect, the predefined associating link code can be printed upon a label, card, or other suitable element.

In yet another aspect, the label, card, or other suitable element displaying the predefined associating link code would be secured to an exterior surface of the gaming machine enclosure.

In yet another aspect, the method further comprises a step of using the obtained identifying information associated with the portable computing device to establish a secured communication link between the portable computing device and the gaming machine.

In yet another aspect, the secured communication link is provided using a near field communication wireless transmission protocol.

In yet another aspect, the secured communication link is provided using a Bluetooth wireless transmission protocol.

In yet another aspect, the secured communication link is provided using a Bluetooth Smart, Bluetooth Low Energy, and/or Bluetooth 4.0 (BLE Bluetooth) wireless transmission protocol.

In yet another aspect, the secured communication link is provided using a Wi-Fi wireless transmission protocol.

In yet another aspect, the tapping process is accomplished using a short range Wi-Fi wireless transmission process.

In yet another aspect, the process further comprises a step of providing the portable computing device with settings associated with the respective gaming machine.

In yet another aspect, the process further comprises a step of providing the portable computing device with settings associated with the respective gaming machine by providing the settings associated with the respective gaming machine from the respective gaming machine.

In yet another aspect, the process further comprises a step of providing the portable computing device with settings associated with the respective gaming machine by providing the settings associated with the respective gaming machine from a system server.

In yet another aspect, the process further comprises a step of mimicking the status or play of game on the respective gaming machine on the portable computing device.

In yet another aspect, the process further comprises a step of mimicking an image of the game on the respective gaming machine on the portable computing device.

In yet another aspect, the process further comprises a step of mimicking the user input configuration of the game on the respective gaming machine on the portable computing device.

In yet another aspect, the communication between the portable computing device and the gaming machine is encrypted.

In yet another aspect, the method further comprises a step of informing the player that the controls have been transferred to the portable computing device.

In yet another aspect, the process further comprises a step of diverting control of the gaming machine from the portable computing device to the gaming machine when the portable computing device exhibits a low battery condition.

In yet another aspect, the process further comprises a step of offering multiple modes of play. The multiple modes can include bonus rounds, variants of the game, and the like.

In yet another aspect, the process further comprises a step of pausing the game when the communication link between the gaming machine and the portable computing device becomes compromised.

In yet another aspect, the process further comprises a step of terminating the game when the communication link between the gaming machine and the portable computing device becomes compromised for an extended or predetermined period of time.

In yet another aspect, the gaming machine can include an instruction set which modifies the gaming instructions upon successful completion of a link between the gaming machine and the portable computing device or Smartphone.

In yet another aspect, upon successful completion of a link between the gaming machine and the portable computing device or Smartphone, the gaming machine instruction set can include a consideration for at least one bonus spin.

In yet another aspect, upon successful completion of a link between the gaming machine and the portable computing device or Smartphone, the gaming machine instruction set can include a consideration for changes in the game play rules.

In yet another aspect, upon successful completion of a link between the gaming machine and the portable computing device or Smartphone, the gaming machine instruction set can include a consideration for changes in the game payout rules.

In yet another aspect, upon successful completion of a link between the gaming machine and the portable computing device or Smartphone, the gaming machine instruction set can include a percentage increase for a payout.

In yet another aspect, upon successful completion of a link between the gaming machine and the portable computing device or Smartphone, the gaming machine instruction set can include a fixed amount increase for a payout.

In yet another aspect, upon successful completion of a link between the gaming machine and the portable computing device or Smartphone, the gaming machine instruction set can include a consideration for any additional benefit to the player.

In yet another aspect, upon successful completion of a link between the gaming machine and the portable computing device or Smartphone, the gaming machine instruction set can include modifications to customize images used while the player plays the game. For example, the modifications to the game played on the gaming machine can include an introduction of characters, animals, or other images or features associated with the player whose portable computing device is linked to the gaming machine.

In yet another aspect, each player's account can include a profile which provides guidelines for the modifications for one or more respective gaming machines.

In yet another aspect, the profile of each player's account can be modified by the player.

In yet another aspect, the profile associated with the player's account can reside in the game controller application.

In yet another aspect, the game controller application can include an option to edit the profile associated with the player.

In yet another aspect, the player's account can include multiple profiles, where the player can select one profile for use during the respective play period.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PRESENT INVENTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
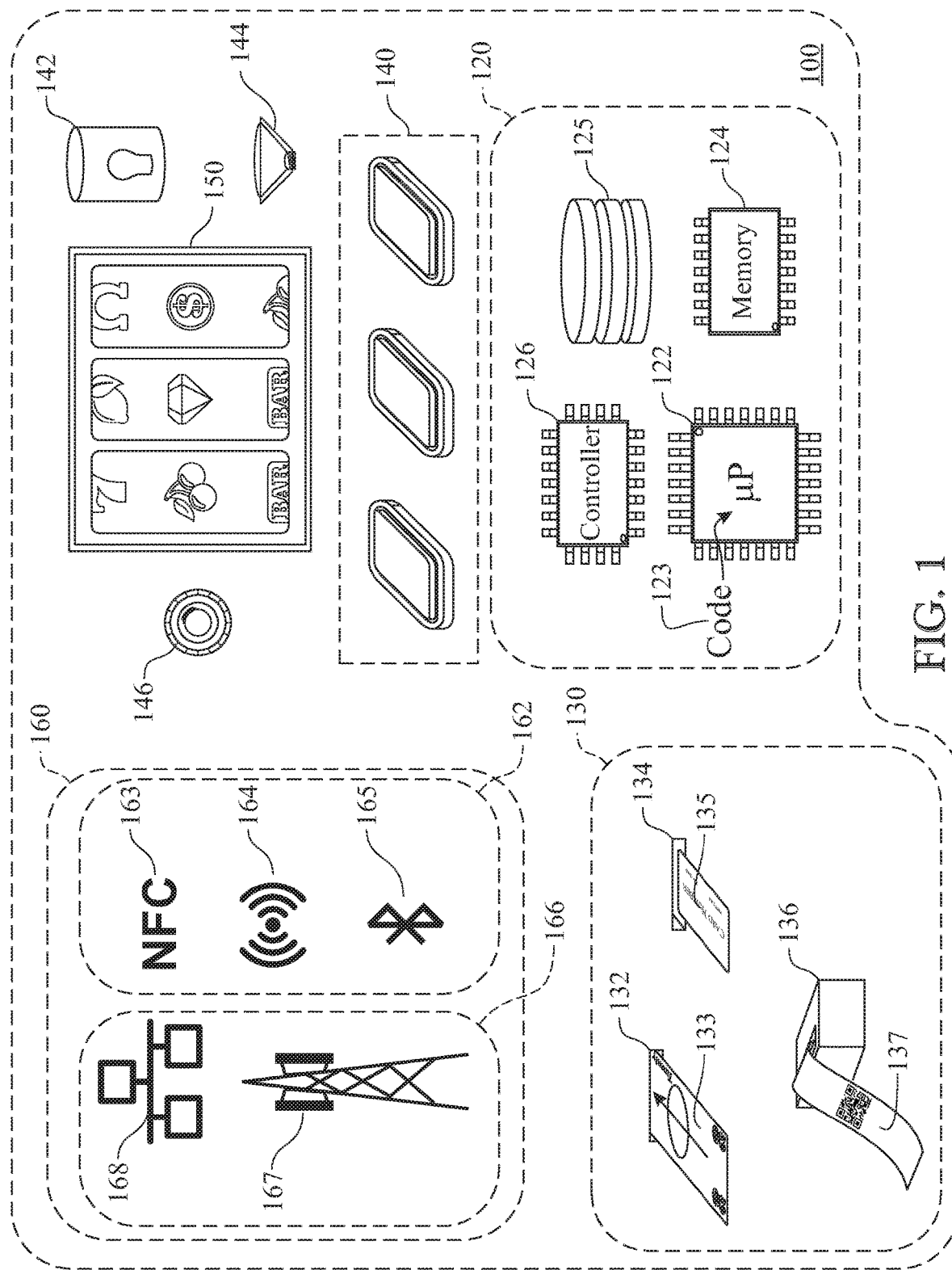
FIG. 1 presents a schematic diagram illustrating components of an exemplary gaming machine.

For purposes of description herein, the terms "upper", "lower", "left", "rear", "right", "front", "vertical", "horizontal", and derivatives thereof shall relate to the invention, when applicable, as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
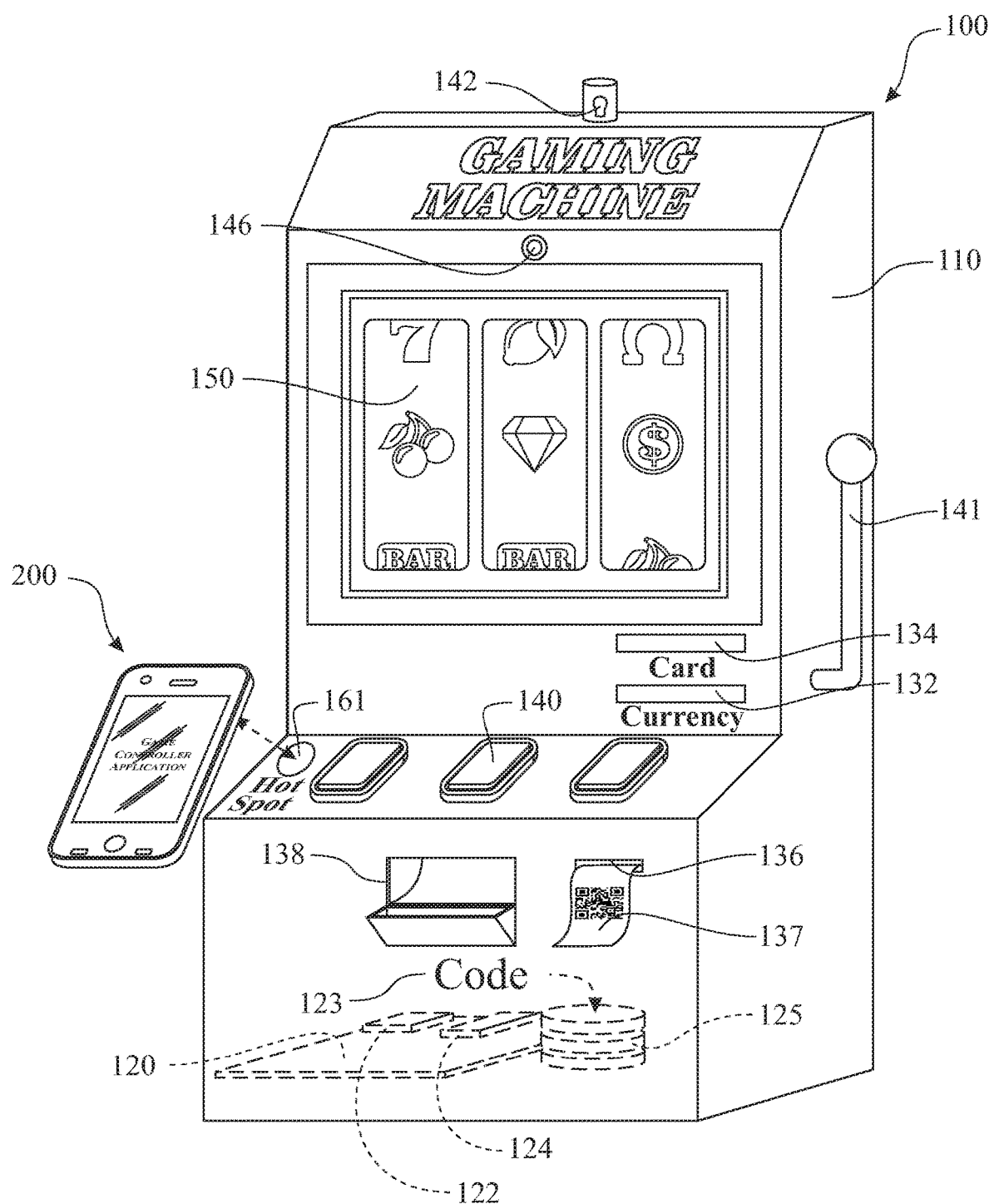
FIG. 3 presents an operational schematic diagram illustrating an exemplary step of tapping the portable computing device against a hot spot of the automated gaming machine to associate the portable computing device and the automated gaming machine with one another.
Figure 4:
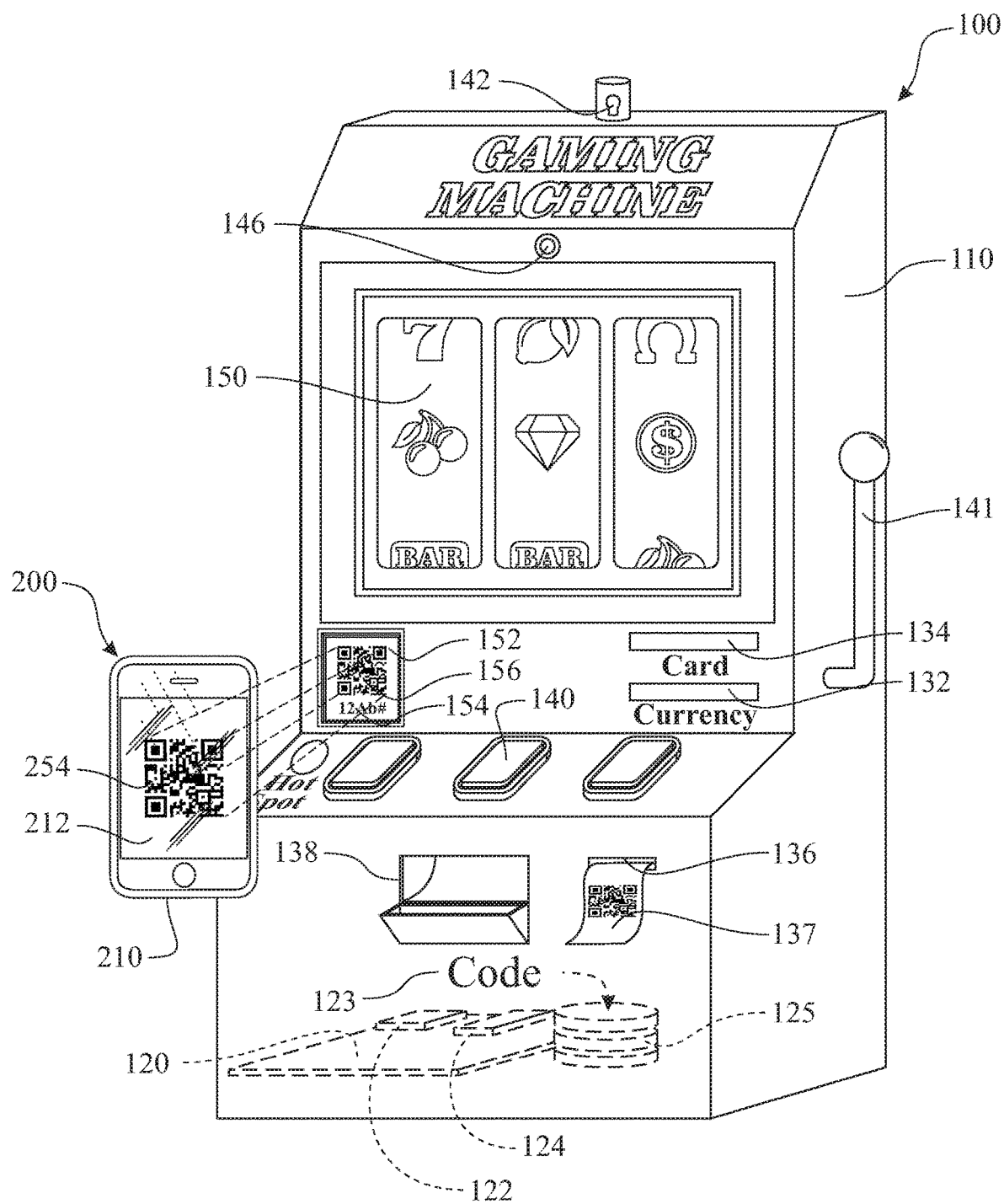
FIG. 4 presents an operational schematic diagram illustrating an exemplary step of acquiring an associating link code from the automated gaming machine to associate or link the portable computing device and the automated gaming machine with one another.
Figure 6:
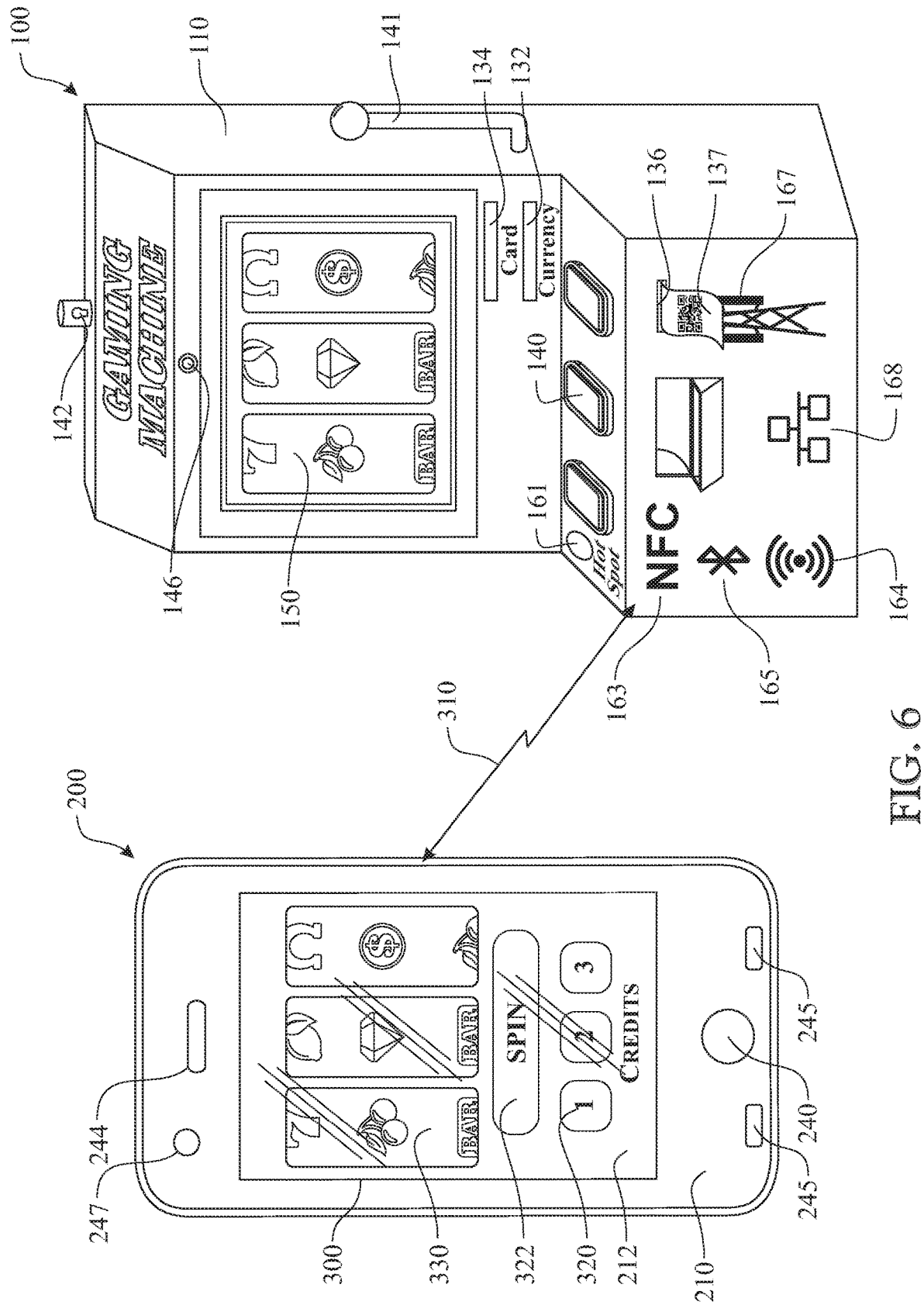
FIG. 6 presents an operational schematic diagram illustrating an exemplary step of employing the portable computing device to provide player instructions to the automated gaming machine.

Currently user input components 140, 141 used for a playing a game on a gaming machine 100 are integrated into the gaming machine 100, as best shown in the illustration presented in FIGS. 3, 4 and 6. The present invention enables a user to utilize a portable computing device 200 as a user input device to operate skilled based games in a casino environment.

Figure 2:
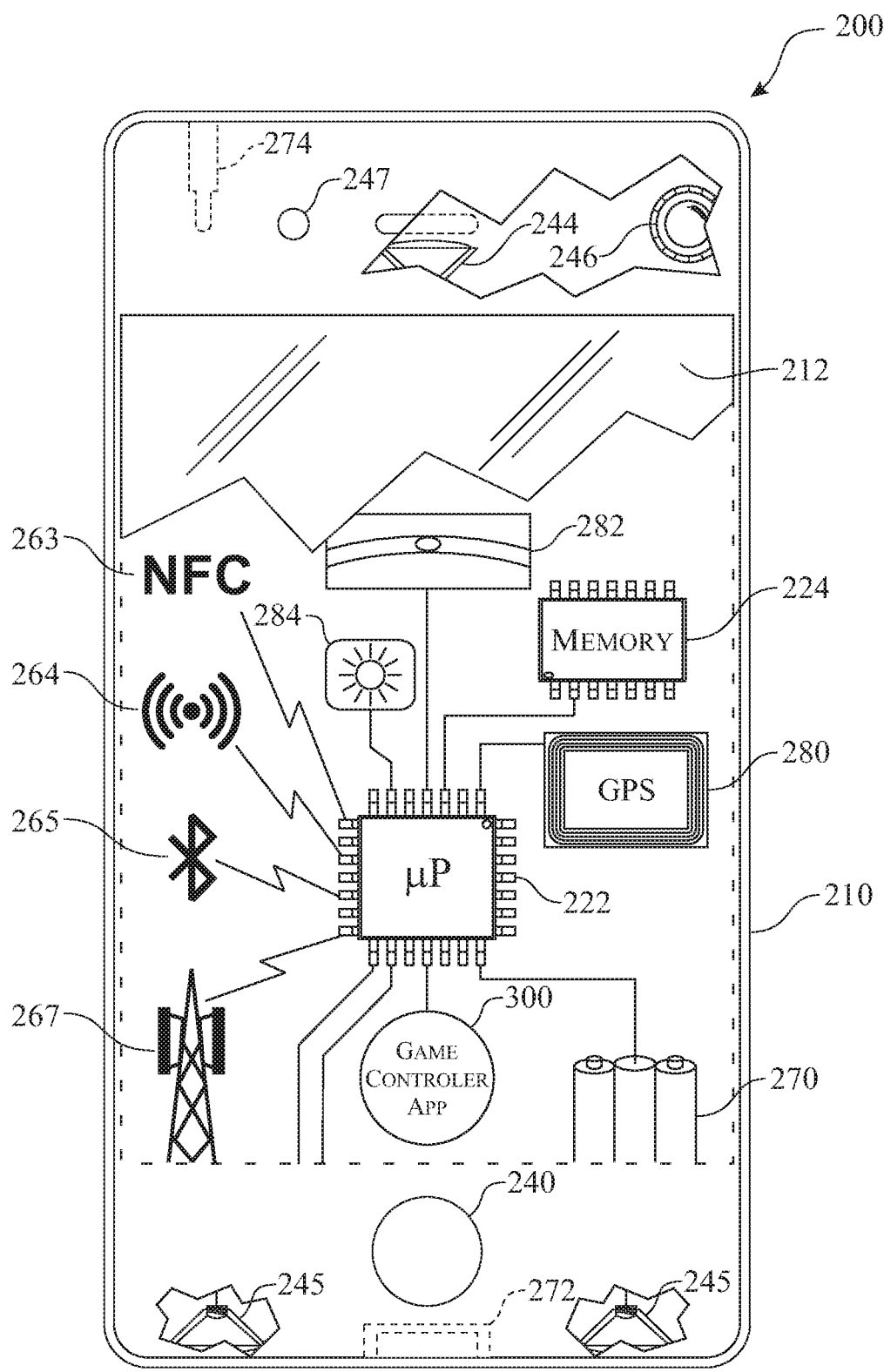
FIG. 2 presents a schematic diagram illustrating components of an exemplary portable computing device, wherein the exemplary portable computing device is illustrated in a form factor of a Smartphone.

Prior to detailing the adaptation of the portable computing device 200 to utilize a portable computing device 200 as a user input device to operate skilled based games in a casino environment, it would be helpful to have knowledge of the various components of each of the automated gaming machine 100 and the portable computing device 200. Details of the automated gaming machine 100 are best presented in the component schematic view presented in FIG. 1 and the operational schematic view illustrated in FIG. 3. Details of the portable computing device 200 are best presented in the component schematic view presented in FIG. 2 and the operational schematic view illustrated in FIG. 6.

A gaming machine enclosure 110 provides the exterior shape and structural foundation for the automated gaming machine 100. The gaming machine enclosure 110 can include sheet metal formed and attached to a frame. The frame supports the various components. The exposed surfaces of the sheet metal can be painted to promote the theme of the associated game to attract the attention of a player. Machine identification and other information, such as a manufacturer, a serial number, gaming approval, and the like can be applied to an exterior of the sheet metal of the gaming machine enclosure 110.

The automated gaming machine 100 includes an operating electronics circuit assembly 120, which provides the operational control of the automated gaming machine 100. The operating electronics circuit assembly 120 includes a microprocessor 122, which operates in accordance with an operating instruction code 123; a non-volatile digital memory device 124, which is provided in signal communication with the microprocessor 122 and used to store information in a digital format wherein the information is readily available for immediate use; a non-volatile digital memory mass storage device 125, which is provided in signal communication with the microprocessor 122 and used to store bulk data; and a gaming controller 126, which is provided in signal communication with the microprocessor 122 and used to control one or more of the functional components of the automated gaming machine 100. From a user interface function, the automated gaming machine 100 includes a user input device 140 and a slot machine arm 141, which provide an ability for a user to make selections and play the game, a visual alerting device 142, which provides a visual alert to the player and others of a sizeable win, such as a jackpot and an audible output device 144 which can provide audible feedback to the player and, at a larger volume, can provide an audible alert to the player and others of a sizeable win, such as a jackpot. A status of the game is presented to the player on an automated gaming mechanism/display 150. Each of the user interface devices 140, 141, 142, 144, 150 is provided in signal communication with the gaming controller 126 and/or the microprocessor 122. The user input device 140 can be of any suitable input device, including a button, a touch screen, a track pad, a track ball, a keypad, and the like. The slot machine arm 141 is included to provide the user with an experience in line with a more mechanically operated machine of yesteryear. It is understood that any suitable user input and/or output device can be included in the automated gaming machine 100 to enhance the user's experience.

The automated gaming machine 100 can optionally include a digital image acquisition device (camera) 146, wherein the digital image acquisition device (camera) 146 is generally used for recording the player's actions and other activities in the area for security purposes. The information acquired by the camera 146 can be stored locally on the non-volatile digital memory mass storage device 125 or remotely, such as on a remotely located server.

The automated gaming machine 100 includes payment processing mechanisms, including a currency handling system 132 for receiving one or more paper currency 133 from the player; a currency dispensing system 138 for dispensing funds; and a printer 136 for printing a printed output 137, wherein the printed output 137 can be in a form of a receipt, a ticket, and the like. The automated gaming machine 100 can additionally include a card reader 134. The card reader 134 provides a capability of reading machine readable cards 135, such as a band card, a credit card, a player loyalty card, and the like. The card reader 134 enables receipt of funds by way of a bank card, a credit card, and the like; an association with a player loyalty account, and any other reasonable function.

Various functions require communication between the automated gaming machine 100 and a remote device, such as a data server, an in house operational server, a credit card clearinghouse (to obtain authorization for the transaction), a banking institution (to obtain authorization for the transaction), and the like. Communication circuitry 160 can be provided in any of a variety of formats, including a proximity wireless communication services 162 and a distant communication services 166. The proximity wireless communication services 162 can use any suitable short range wireless communication, such as a Near Field Communication (NFC) protocol 163, a Wi-Fi communication protocol 164, a Bluetooth communication protocol 165 (including a Bluetooth Smart, Bluetooth Low Energy, Bluetooth 4.0 (BLE Bluetooth) wireless transmission protocol), and the like. The proximity wireless communication circuitry/antenna 162 would be located proximate a hot spot 161 on the gaming machine enclosure 110 of the automated gaming machine 100 at any suitable location that would be accessible by the player. It is understood that any short range wireless communication protocol can be used. It is preferred that the selected short range wireless communication protocol be one that ensures proper and secure communication between the proximity wireless communication services 162 and the player's automated gaming machine 100, and avoids any communication between either the proximity wireless communication services 162 or the player's automated gaming machine 100 and an unwanted third party portable electronic device. The communication circuit 160 can additionally provide encryption to enhance the overall security of the communication between the automated gaming machine 100 and the portable computing device 200.

The distant communication services 166 can use any suitable long range, secured wired and/or wireless communication, such as an Ethernet communication protocol 168, a cellular communication protocol 167, and the like. It is understood that any suitable long range, secured wired and/or wireless communication protocol can be used. The proximity wireless communication services 162 and the distant communication services 166 would be in signal communication with the microprocessor 122.

The automated gaming machine 100 can be provided in a form of any automated gaming device, including a slot machine, including a three wheel machine, a five wheel machine, an animated version, and the like; an automated table game including a poker game, a roulette game, a blackjack game, craps, a baccarat game, and the like; or any other automated gambling application. The automated gaming machine 100 can be enhanced to play skill based games in a casino environment. The user input device 140, slot machine arm 141, and the automated gaming mechanism/display 150 would be configured according to the selected game. The automated gaming machine 100 can include additional user interface components to support the skilled based games.

The microprocessor 122 can include an instruction set adapted for a remotely operated gaming controller. The instruction set can be tailored specifically to the game or games available on the specific automated gaming machine 100. The instruction set can include information which mimics the user input functions/configuration, mimic the game components, replicate operation of the game in real time, replicate images of the game in real time, and the like. Details of this function will be described later herein in conjunction with the operation of the present invention. Alternatively, the game specific information could be provided by a remotely located information server.

The portable computing device 200 can be any suitable portable computing device, including a Smartphone, a portable computing tablet, a personal data assistant, a portable electronic wallet, or any other suitable portable computing device comprising the associated functions. The exemplary portable computing device 200 is a Smartphone. Although the components described herein are directed towards the Smartphone, it is understood that the components integrated into the portable computing device 200 would be those associated with the specific form factor.

A portable computing device housing 210 provides the exterior shape and structural foundation for the portable computing device 200. The portable computing device housing 210 can be fabricated of any suitable material, including plastic, glass reinforced plastic, metal, and the like. The portable computing device housing 210 supports and protects the various components of the portable computing device 200.

The portable computing device 200 includes a microprocessor 222, which operates in accordance with a set of operating instruction, which includes a game controller application 300 (introduced in FIG. 6) and a non-volatile digital memory device 224, which is provided in signal communication with the microprocessor 222 and used to store information in a digital format.

Motion and location information can be acquired by a Global Positioning System (GPS) circuitry 280 (or a similar locating system), an electronic gyroscope and/or level 282, an electronic compass (not shown), and the like. Each of the motion and location sensing devices is provided in signal communication with the microprocessor 222.

The portable computing device 200 includes user interface components, such as a portable computing device touch screen display 212, a user input device 240, an audible output device 244, an audible input/output device 245, a first digital image acquisition device (camera) 246, and the like. The portable computing device display 212 can be a standard liquid crystal display, a touch screen display, and the like. The portable computing device display 212 can include a backlighting system, such as an electroluminescent panel, and the like. The user interface components can additionally include a keypad, a stylus, a track pad, a trackball, and the like.

The portable computing device 200 includes communication circuits, near field communication services, such as a Near Field Communication (NFC) protocol 263, a Wi-Fi communication protocol 264, a Bluetooth communication protocol 265, and the like and far field communication services, such as Bluetooth communication protocol 265, cellular communication protocol 267, and the like. The communication circuits are in signal communication with the microprocessor 222.

The portable computing device 200 can include optional ancillary components, such as a first digital image acquisition device (camera) 246, a second digital image acquisition device (camera) 247, a general interface connector 272, an audio connector 274, a light sensing device 284, and others. The first digital image acquisition device (camera) 246 enables capturing images from a rear face of the portable computing device 200. The second digital image acquisition device (camera) 247 enables capturing images from a front face of the portable computing device 200. The general interface connector 272 enables connectivity for data transfers, power, connectivity to other devices, and the like. The audio connector 274 enables audio output to a remote device, such as a headphone, ear-buds, and the like. The light sensing device 284 is employed to determine an ambient lighting and consequently adjust the backlighting of the portable computing device display 212, establish a flash setting when using the first digital image acquisition device (camera) 246, and the like.

Power is provided to the electronically operated components by a portable power supply 270. A power regulating circuit (voltage and/or amperage) can be integrated between the portable power supply 270 and one or more of the electrically powered components to ensure proper and adequate power distribution.

The game controller application 300, introduced in FIG. 6, is adapted to utilize the components of the portable computing device 200 to provide communication between the automated gaming machine 100 and the portable computing device 200, provide user inputs through any of the user entry components, provide user inputs through any of the motion detecting components, and the like. The user entry components can include one or more digital buttons 240, the touch screen display 212, and any other user entry device included in the portable computing device 200. Additionally, the portable computing device 200 can obtain audible inputs through the audible input/output device 245, which can be adapted for use as instructions while playing the game on the automated gaming machine 100. The inclusion of a touch screen 212 enables an adaptable user input configuration. The touch screen 212 provides an ability for use of a graphical user interface that can be modified to mimic any user input configuration of any automated gaming machine 100.

The use of the portable computing device 200 to provide user input into the game introduces the ability to obtain user inputs from motion of the portable computing device 200. The typical user input components 140, 141 integrated into the automated gaming machine 100 are fixed to the gaming machine enclosure 110. Therefore, they are unable to provide a freedom of motion input function.

Figure 5:
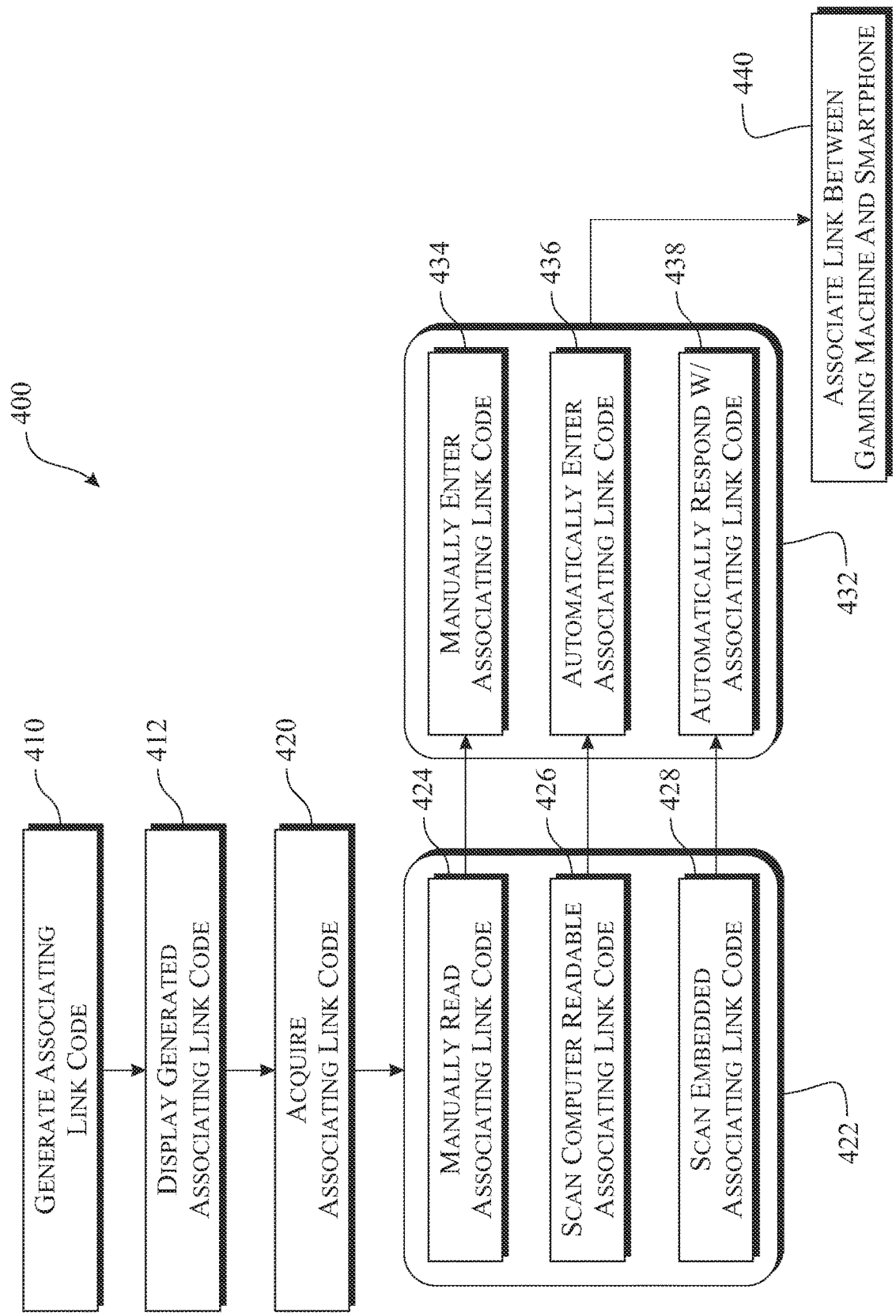
FIG. 5 presents a flow diagram illustrating exemplary operational steps of a method of establishing an association or a link between the automated gaming machine and the portable computing device with one another in accordance with the present invention.

A hot spot 161 enables use of a tapping process or other wireless communication process for creating an association or a wireless link between the automated gaming machine 100 and the portable computing device 200. It is recognized that other methods can be utilized to create the same association or wireless link between the automated gaming machine 100 and the portable computing device 200. Several examples are presented in FIGS. 4 and 5.

The automated gaming machine 100 can optionally include an association linking code display 152 (not shown in FIGS. 3 and 6). A human readable association linking code image 154 and/or a machine readable association linking code image 156 can be presented on the automated gaming mechanism/display 150, the optional association linking code display 152, or any other suitable display located on or proximate the automated gaming machine 100. The use of the human readable association linking code image 154 and/or the machine readable association linking code image 156 is described in an exemplary gaming machine to Smartphone associating link flow diagram 400 illustrated in FIG. 5. The gaming machine to Smartphone associating link flow diagram 400 would initiate with a step of generating an associating link code (step 410). The associating link code could be generated by the operating instruction code 123 of the automated gaming machine 100, a server associated with the automated gaming machines 100 installed in the facility, or any other suitable associating link code generation device. The associating link code is converted to a predetermined image format for presentation on the association linking code display 152. This can include a human readable association linking code image 154, a machine readable association linking code image 156 or a combination of both the human readable association linking code image 154 and the machine readable association linking code image 156, as illustrated. The human readable association linking code image 154 can be a numeric sequence, an alphabetical sequence, an alpha-numeric sequence, a character sequence, or any other suitable sequence. The predetermined image format would be presented on the association linking code display 152 (step 412).

It is understood that a more basic alternative can be employed. The associating link code can be predetermined and more permanently displayed on the automated gaming machine 100. The associating link code can be printed upon a label, card, or other suitable element, where the label, card, or other suitable element would be secured to an exterior surface of the gaming machine enclosure 110.

The player would acquire the associating link code using any suitable method (step 420). Several exemplary methods are included as acquiring gaming machine and Smartphone associating link options 422. Each of the optional exemplary methods included in the acquiring gaming machine and Smartphone associating link options 422 employs an associated method of responding, such as those identified as entering gaming machine and Smartphone associating link options 432.

In a first exemplary solution, the human readable association linking code image 154 can be manually read by the player (step 424). The manually read human readable association linking code image 154 is then manually entered into an application operating on the portable computing device 200 (step 434). The application would transmit any and all necessary information to a predetermined recipient. The information can include the associating link code, the geographic position where the portable computing device 200 is currently located, player information, identification information of the portable computing device 200, and any other information required or desired to create a link between the portable computing device 200 and the automated gaming machine 100. The information can be pre-programmed into the application, manually entered during the process of creating the link between the portable computing device 200 and the automated gaming machine 100, automatically entered during the process of creating the link between the portable computing device 200 and the automated gaming machine 100, or any combination in part or in whole thereof. The information would then be forwarded to a target recipient. The final recipient of the information would be the automated gaming machine 100. The automated gaming machine 100 would utilize the received information to establish the link between the portable computing device 200 and the automated gaming machine 100 (step 440). The process is accomplished exclusive of any requirement for communication between the electronic gaming machine and the gaming network for player tracking purposes.

In a second exemplary solution, the machine readable association linking code image 156 is acquired using an image acquisition process (step 426). In this solution, the machine readable association linking code image 156 would be acquired or scanned using the application. The machine readable association linking code image 156 is acquired using the digital image acquisition device (camera) 246 of the portable computing device 200. The machine readable association linking code image 156 can be any suitable machine readable format, including any suitable barcode, any suitable Quick Read (QR) code, or any other suitable machine readable format. The decoded associating link code would be automatically provided to the application (step 436). The application would then operate as previously described to create the link between the portable computing device 200 and the automated gaming machine 100.

In a third exemplary solution, the machine readable association linking code image 156 is acquired using an image acquisition process (step 428). In this solution, the machine readable association linking code image 156 would automatically activate a website or an application on the portable computing device 200. The machine readable association linking code image 156 would include a link to automatically activate the website or the application on the portable computing device 200. An exemplary format of the respective machine readable image is: "https://www.domain.com/example.html?id=example1"; wherein "www.domain.com" identifies the domain, "example.html" identifies the associated webpage, and "?id=example1" provides the unique identifier associated with the specific request to establish a link between the automated gaming machine 100 and the portable computing device 200. The associated webpage would include an automated instruction set to decode the unique identifier associated with the specific request from the machine readable association linking code image 156, determine which automated gaming machine 100 issued the associating link code, validates the request, (step 438), which then establishes a secured link between the automated gaming machine 100 and the portable computing device 200 (step 440). The preferred format of the machine readable association linking code image 156 would be a Quick Read (QR code).

Figure 7:
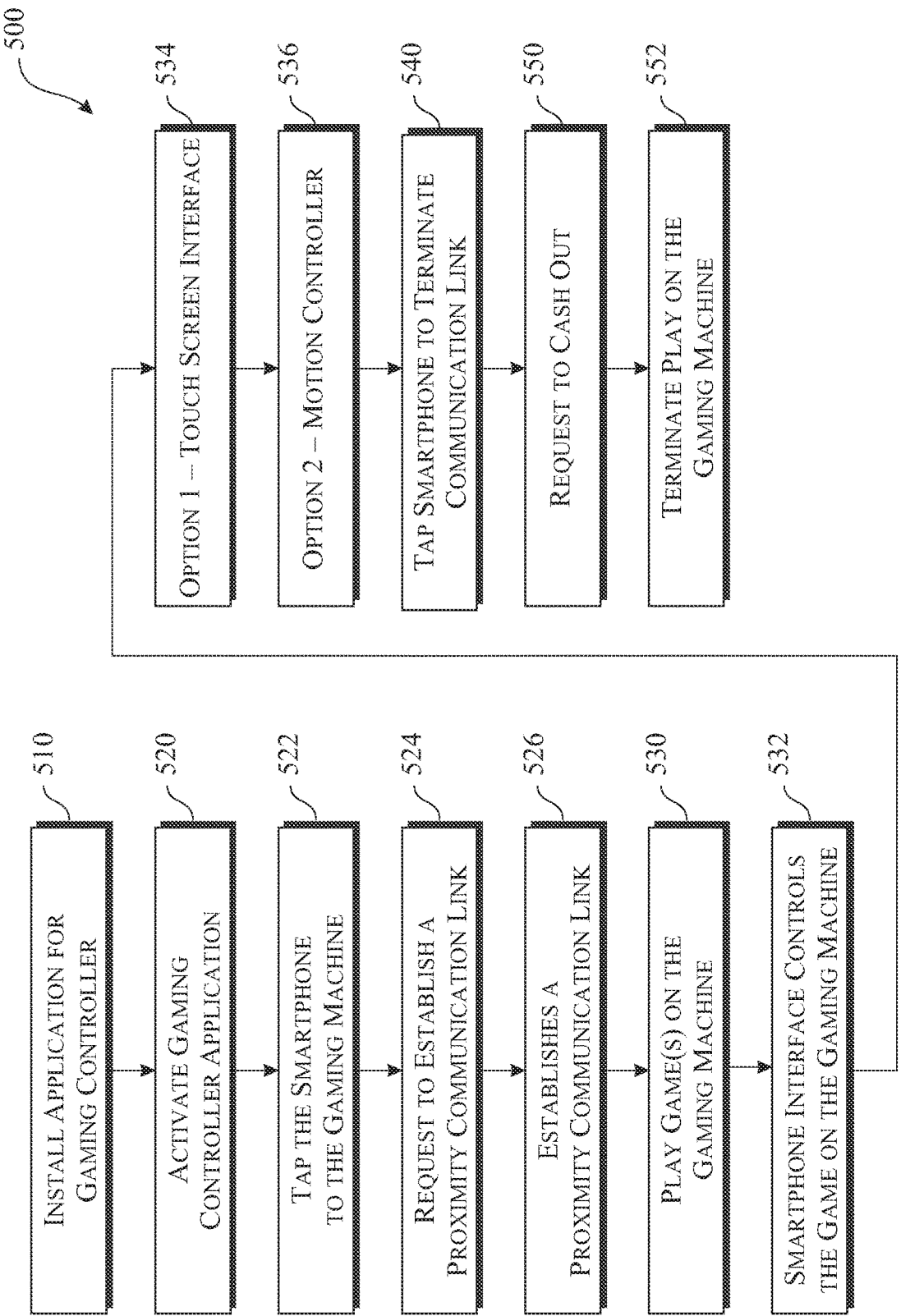
FIG. 7 presents a flow diagram illustrating exemplary operational steps of a method of using a portable computing device as a gaming controller for providing player instructions to a gaming machine in accordance with the present invention.

Use of the portable computing device 200 as a game controller is illustrated in FIGS. 3, 4 and 6 and described in a game controller application flow diagram 500 presented in FIG. 7. The player would install the game controller application 300 onto the portable computing device 200 using any known application installation process (step 510). The player would activate the game controller application 300 (step 520). The player would tap the portable computing device 200 against the automated gaming machine 100 at a location proximate the hot spot 161 (step 522). The term tapping refers to physically contacting, waving across, or any other near field placement of the portable computing device 200 to the hot spot 161 on the gaming machine 100. The tapping process can be accomplished using any suitable short range wireless communication protocol, including, but not limited to the Near Field Communication (NFC) protocol 163, the Wi-Fi communication protocol 164, and/or the Bluetooth communication protocol 165 (including Bluetooth Smart, Bluetooth Low Energy, Bluetooth 4.0 (BLE Bluetooth) wireless transmission protocol). During the process of tapping the portable computing device 200 to the automated gaming machine 100, the portable computing device 200 can provide one or more unique identifiers to the automated gaming machine 100; the automated gaming machine 100 can provide one or more unique identifiers to the portable computing device 200; or both. The unique identifier(s) can be employed to create and retain a secured communication link between the automated gaming machine 100 and the portable computing device 200. Following the tapping step, the automated gaming machine 100 and/or the portable computing device 200 can request to establish a proximity communication link (step 526). This introduces an additional step for security, where the player would approve or reject the request. Upon approval of the request by the player, a bi-directional communication link between the automated gaming machine 100 and the portable computing device 200 is established. The automated gaming machine 100 would monitor the status of the connection throughout the entire period of time that the player is playing a game on the automated gaming machine 100. The player would provide sufficient funds to obtain a desired amount of credits on the automated gaming machine 100. Once the communication link 310 is established and at least a minimum count of credits are posted on the automated gaming machine 100, the player can initiate play of the game(s) on the automated gaming machine 100 (step 530). During play, the player uses the portable computing device 200 to provide input to the automated gaming machine 100 to control the game on the automated gaming machine 100 (step 532). The portable computing device 200 can include a variety of user input functions. In a first option, the user provides guidance to the game by inputting their desired instructions using the touch screen 212 or other contact input components 240 (step 534). In a second option, the user provides guidance to the game by inputting their desired instructions using the motion detection components 280, 282 of the portable computing device 200 (step 536). In a third option, the user can provides guidance to the game by inputting their desired instructions using both, the touch screen 212 or other contact input components 240 and the motion detection components 280, 282.

During the process of playing a game or games on the gaming machine 100, the game controller application 300 can display buttons or icons to replicate the functional input components of the gaming machine 100. In the exemplary embodiment, the game controller application 300 presents a series of credit assertion buttons 320, replicating the same functional components, generically identified as the user input devices 140 and a spin button 322, functionally replicating the slot machine arm 141.

The player would continue to play the game until the total number of available credits is depleted or the player decides to terminate play of the game on the automated gaming machine 100 (step 540).

Alternatively, the length of play on the automated gaming machine 100 can be determined by the remaining credits. An associated number of credits would be subtracted from the total number of pending credits for each game played. An associated number of credits would be added to the total number of pending credits when the player wins a game. This process would continue until the number of credits equals zero or the player decides to discontinue play at the automated gaming machine 100. When the number of credits equals zero, the player can provide funds or tokens to increase the total number of pending credits or elect to discontinue play at the automated gaming machine 100 (step 540). The method in which the player informs the gaming machine 100 that the player desires to terminate play on the gaming machine 100 can vary, wherein the method would be determined by the gaming designer. In one exemplary method to terminate the communication link and play of the game, the user can tap the portable computing device 200 against the automated gaming machine 100 using any of the methods previously described (step 540). When the player decides to discontinue play at the automated gaming machine 100 and the automated gaming machine 100 has a remaining total number of pending credits, the player can request to cash out (step 550). In one exemplary method to request to cash out, the player can tap their portable computing device 200 against the hot spot 161. Since the player was previously established a communication link between the automated gaming machine 100 and the portable computing device 200, the second tapping process would indicate that the player desires to terminate the play at the gaming machine 100 and cash out. When the request to cash out has been submitted, the automated gaming machine 100 would provide the player with the appropriate payout in accordance with the proper procedure. This can include dispensing funds (coins and/or currency), printing a ticket, transferring the value of the credit to an associated banking institution, transferring the value of the credit to an associated credit institution, and the like. Upon completion, the automated gaming machine 100 terminates the gaming session (step 552).

In another alternative method, the gaming machine 100 can monitor the proximity of the associated portable computing device 200 to the gaming machine 100. This can be established during the initial tapping process when the gaming machine 100 identifies an identification of the portable computing device 200. The gaming machine 100 can be placed upon hold when the gaming machine 100 determines that the portable computing device 200 associated with the player travels beyond a predetermined distance from the gaming machine 100. The automated gaming machine 100 can subsequently terminate the play of the game on the automated gaming machine 100 in a condition where the automated gaming machine 100 continues to determine that the portable computing device 200 associated with the player travels beyond a predetermined distance from the gaming machine 100 over a substantial period of time. When the portable computing device 200 associated with the player travels beyond a predetermined distance from the gaming machine 100, the game controller application 300 can present a message asking the player to connect or reinstate the connection between the portable computing device 200 and the automated gaming machine 100.

The game controller application 300 can include a process which would convey a status of the portable power supply 270 of the portable computing device 200 to the automated gaming machine 100. The automated gaming machine 100 can monitor the status or charge level of the portable power supply 270 of the portable computing device 200. In a condition where the status or charge level of the portable power supply 270 of the portable computing device 200 is reduced to a predetermined level, the automated gaming machine 100 would convert from a portable computing device input mode to a different input mode, such as a standard play mode, wherein input is provided through the integrated input devices 140, 141.

Figure 8:
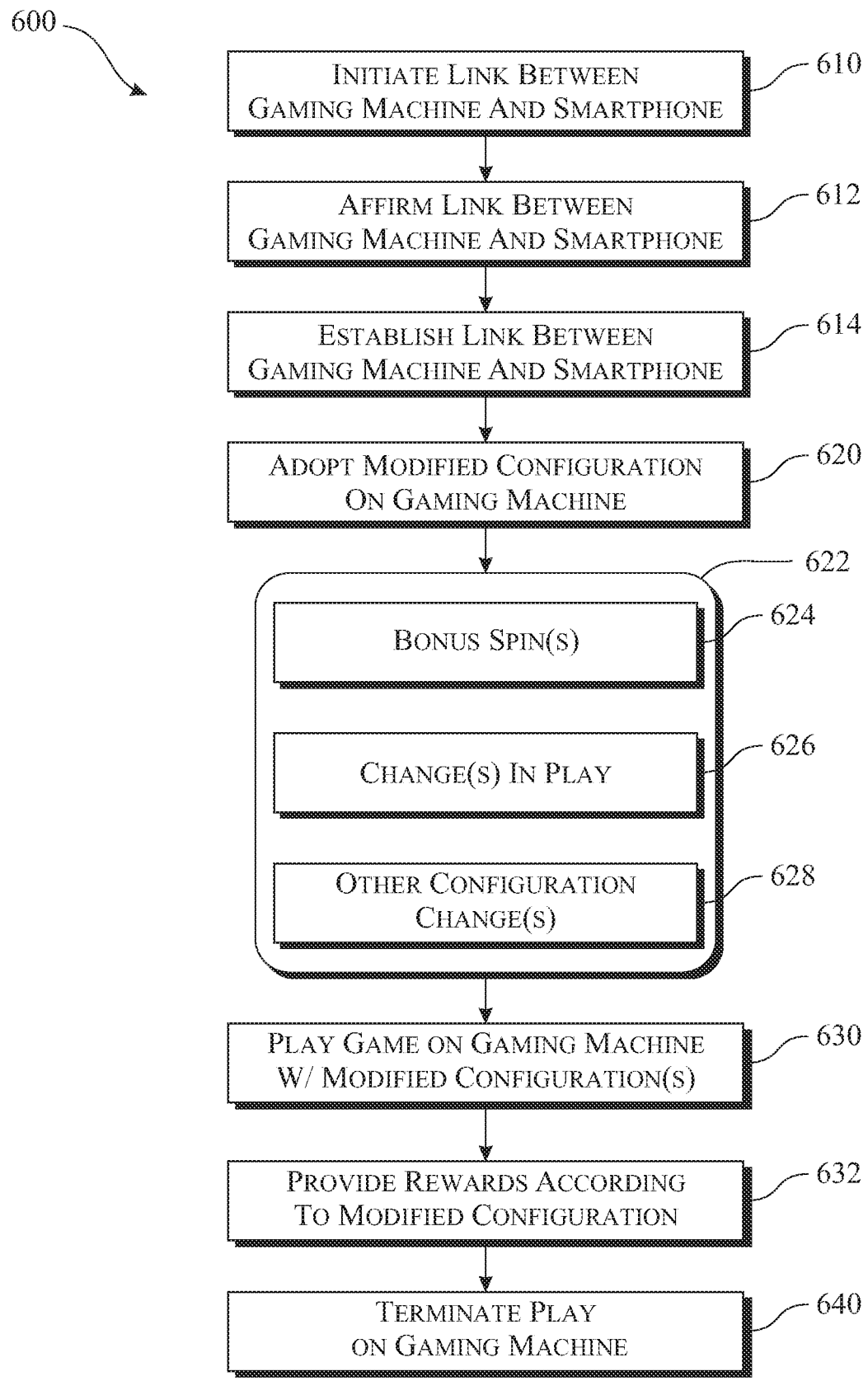
FIG. 8 presents a flow diagram illustrating exemplary operational steps of a method of using a portable computing device as a gaming controller for providing player instructions to a gaming machine in accordance with the present invention.

One a link or association is established between the automated gaming machine 100 and the portable computing device 200, the gaming instruction set on the automated gaming machine 100 can be modified to a accommodate a customized protocol based upon the player and/or the wireless linked profile, such as in linked gaming machine and Smartphone gaming configuration modification flow diagram 600, presented in FIG. 8.

A first step of the linked gaming machine and Smartphone gaming configuration modification flow diagram 600 is a step of initiating a link between the automated gaming machine 100 and the portable computing device 200 (step 610). One method of accomplishing this step would be to generate a unique associating link code. The associating link code would then be returned to the automated gaming machine 100 using any suitable process. The reported associating link code would be compared to the generated associating link code to affirm or reject the request. The process would continue in a condition where the reported associating link code is affirmed (step 612). Upon affirming the reported associating link code compared to the generated associating link code, the automated gaming machine 100 and the portable computing device 200 establish a link therebetween (step 614). The process is accomplished exclusive of any requirement for communication between the electronic gaming machine and the gaming network for player tracking purposes. Upon establishing of the link between the automated gaming machine 100 and the portable computing device 200 the game instruction set of the portable computing device 200 can be modified (step 620). The modifications can include any or all of the adopting modified configurations to the gaming machine exemplary options 622. The custom instruction set would modify the game play 626, the method of determining bonus spin(s) 624, and the like 628. Examples of some modifications include introduction of a consideration for at least one bonus spin 624, a bonus game, bonus time, extra card (or other play element) change, a consideration for changes in the game play rules 626, a consideration for changes in the game payout rules, a percentage increase for a payout, a fixed amount increase for a payout, and a consideration for any additional benefit to the player 628. The modifications can be provided prior to play on the automated gaming machine 100 (step 630), during play on the automated gaming machine 100, between games on the automated gaming machine 100, or any other reasonable time. The automated gaming machine 100 would proceed in accordance with the modified instruction set and issue rewards accordingly (step 632). The player would continue playing games on the automated gaming machine 100 until a point when the player decides to terminate play on the automated gaming machine 100 (step 640). Upon termination of play, the link or association between the automated gaming machine 100 and the portable computing device 200 would be discontinued. Alternatively, the link between the automated gaming machine 100 and the portable computing device 200 can be discontinued by the player, thus ending play on the automated gaming machine 100 (step 640).

In other examples of customization to the gaming machine can include modifications to introduce customize images, which would be used while the player plays the game on the gaming machine 100. For example, the modifications to the game played on the gaming machine 100 can include an introduction of characters, animals, or other images or features associated with the player whose portable computing device 200 is linked to the gaming machine 100.

The modifications can be random, based upon a predetermined profile of use, based upon the specific portable computing device, based upon a profile of the player, based upon a profile provided by the application operating on the portable computing device, and the like. The profile can be stored on the portable computing device, within the game controller application 300, at a data storage server accessible by the gaming machine 100, or any other suitable data storage location. The profile can be modified by the player, the player's host (casino), both, or any other suitable party. The game controller application 300 can include a function enabling the player to modify the associated profile. The profile can be transferred to the gaming machine 100 during the linking process. The player's account can include multiple profiles, where the player can select one profile for use during the respective play period.

Although the game controller application flow diagram 500 presents the steps in a certain order, it is understood that the order of the steps may vary.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

| Ref. No. | Description |
| --- | --- |
| 100 | automated gaming machine |
| 110 | gaming machine enclosure |
| 120 | operating electronics circuit assembly |
| 122 | microprocessor |
| 123 | operating instruction code |
| 124 | non-volatile digital memory device |
| 125 | non-volatile digital memory mass storage device |
| 126 | gaming controller |
| 130 | payment processing mechanisms |
| 132 | currency handling system |
| 133 | paper currency |
| 134 | card reader |
| 135 | card |
| 136 | printer |
| 137 | printed output |
| 138 | currency dispensing system |
| 140 | user input device |
| 141 | slot machine arm |
| 142 | visual alerting device |
| 144 | audible output device |
| 146 | digital image acquisition device (camera) |
| 150 | automated gaming mechanism/display |
| 152 | association linking code display |
| 154 | human readable association linking code image |
| 156 | machine readable association linking code image |
| 160 | communication circuit |
| 161 | hot spot |
| 162 | proximity wireless communication services |
| 163 | Near Field Communication (NFC) protocol |
| 164 | Wi-Fi communication protocol |
| 165 | Bluetooth communication protocol |
| 166 | distant communication services |
| 167 | cellular communication protocol |
| 168 | Ethernet communication protocol |
| 200 | portable computing device |
| 210 | portable computing device housing |
| 212 | portable computing device display |
| 222 | microprocessor |
| 224 | non-volatile digital memory device |
| 240 | user input device |
| 244 | audible output device |
| 245 | audible input/output device |

-continued

| Ref. No. | Description |
|---|---|
| 246 | first digital image acquisition device (camera) |
| 247 | second digital image acquisition device (camera) |
| 263 | Near Field Communication (NFC) protocol |
| 264 | Wi-Fi communication protocol |
| 265 | Bluetooth communication protocol |
| 267 | cellular communication protocol |
| 270 | portable power supply |
| 272 | general interface connector |
| 274 | audio connector |
| 280 | Global Positioning System (GPS) circuitry |
| 282 | electronic gyroscope |
| 284 | light sensing device |
| 300 | game controller application |
| 310 | game machine and portable electronic device communication link |
| 320 | credit assertion button |
| 322 | spin button |
| 330 | game status replication image |
| 400 | gaming machine to Smartphone associating link flow diagram |
| 410 | generate gaming machine and Smartphone associating link step |
| 412 | display gaming machine and Smartphone associating link step |
| 420 | acquiring gaming machine and Smartphone associating link step |
| 422 | acquiring gaming machine and Smartphone associating link options |
| 424 | manually reading gaming machine and Smartphone associating link step |
| 426 | scanning computer readable gaming machine and Smartphone associating link step |
| 428 | scanning computer readable embedded gaming machine and Smartphone associating link step |
| 432 | entering gaming machine and Smartphone associating link options |
| 434 | manually entering gaming machine and Smartphone associating link step |
| 436 | automatically entering computer readable gaming machine and Smartphone associating link step |
| 438 | automatically entering and responding computer readable embedded gaming machine and Smartphone associating link step |
| 440 | associate a link between the faming machine and the Smartphone step |
| 500 | game controller application flow diagram |
| 510 | installation of gaming controller application step |
| 520 | activation of gaming controller application step |
| 522 | tap the portable computing device to the gaming machine step |
| 524 | request to establish a proximity communication link step |
| 526 | establish a proximity communication link step |
| 530 | play games on the gaming machine step |
| 532 | portable electronic device interface controls the game on the gaming machine step |
| 534 | option: utilize the touch screen interface for controlling the game step |
| 536 | option: utilize the motion controller interface for controlling the game step |
| 540 | tap the portable computing device to the gaming machine to terminate communication link step |
| 550 | request cash out step |
| 552 | terminate play on the machine step |
| 600 | linked gaming machine and Smartphone gaming configuration modification flow diagram |
| 610 | initiate gaming machine and Smartphone link step |
| 612 | affirm gaming machine and Smartphone link request step |
| 614 | establish gaming machine and Smartphone link step |
| 620 | adopt modified configuration on gaming machine step |
| 622 | adopt modified configuration on gaming machine exemplary options |
| 624 | include bonus spin(s) step |
| 626 | modifications in game play step |
| 628 | other link related modifications |
| 630 | play modified game on gaming machine step |
| 632 | provide rewards according to modified gaming instructions step |
| 640 | terminate play on the gaming machine step |

What is claimed is:

1. A method using a gaming machine controller application, the method comprising steps of:

installing the gaming controller application onto a portable computing device;

activating the gaming controller application;

initializing a short range, wireless communication link directly between a gaming machine and the portable computing device, wherein the initialized short range, wireless communication link directly between the gaming machine and the portable computing device is initialized by a player using the portable computing device, wherein the initialized short range, wireless communication link directly between the gaming machine and the portable computing device is a first time any communication link between the gaming machine and the portable computing device is established, exclusive of any prior communication between the portable computing device and any gaming network in the gaming facility and accomplished exclusive of any requirement for communication between the electronic gaming machine and the gaming network for player tracking purposes, wherein the short range, wireless communication link utilizes a Bluetooth communication protocol;

maintaining the short range, wireless communication link directly between the gaming machine and the portable computing device, wherein the short range, wireless communication link provides a conduit for gaming instructions between the portable computing device and the gaming machine;

utilizing the gaming controller application to provide instructions to the gaming machine to play a game thereon; and at least one of the following steps:
(a) displaying an output of the gaming machine on a display of the gaming machine and the output of the gaming machine on the portable computing device at a same time, and
(b) replicating a gaming display image of the gaming machine on a display of the gaming machine and the output of the gaming machine on the portable computing device at a same time.

2. The method using a gaming machine controller application as recited in claim 1, wherein the step of utilizing the gaming controller application to provide instructions to the gaming machine includes a representation of at least a portion of input functions available on the gaming machine.

3. The method using a gaming machine controller application as recited in claim 1, wherein the step of initializing a short range, wireless communication link directly between the gaming machine and the portable computing device includes a step of:
obtaining an associating link code associated with the respective gaming machine.

4. The method using a gaming machine controller application as recited in claim 1, wherein the step of initializing a short range, wireless communication link directly between the gaming machine and the portable computing device includes steps of:
generating an associating link code associated with the respective gaming machine;
displaying the generated associating link code associated with the respective gaming machine on a display on or proximate the gaming machine; and
obtaining the generated associating link code associated with the respective gaming machine.

5. The method using a gaming machine controller application as recited in claim 1, wherein the step of initializing a short range, wireless communication link directly between the gaming machine and the portable computing device further includes steps of:
obtaining an associating link code associated with the respective gaming machine by scanning a machine readable representation of the associating link code.

6. The method using a gaming machine controller application as recited in claim 1, wherein the step of initializing a short range, wireless communication link directly between the gaming machine and the portable computing device further includes steps of:
obtaining an associating link code associated with the respective gaming machine by scanning a machine readable representation of the associating link code, wherein the machine readable representation of the associating link code includes an embedded link to at least one of a website and an application.

7. The method using a gaming machine controller application as recited in claim 1, further comprising a step of:
modifying a configuration of a game played on the gaming machine upon establishment of the short range, wireless communication link between a gaming machine and the portable computing device.

8. The method using a gaming machine controller application as recited in claim 1, further comprising steps of:
providing a profile to the gaming machine; and
modifying a configuration of a game played on the gaming machine upon establishment of the short range, wireless communication link between a gaming machine and the portable computing device, wherein the modifications are based upon the provided profile.

9. A method using a gaming machine controller application, the method comprising steps of:
installing the gaming controller application onto a Smartphone;
activating the gaming controller application;
initializing a short range, wireless communication link directly between a gaming machine and the Smartphone, wherein the initialized short range, wireless communication link directly between the gaming machine and the Smartphone is a first time any communication link between the gaming machine and the Smartphone is initialized by a player using the Smartphone, wherein the initialized short range, wireless communication link directly between the gaming machine and the Smartphone is established, exclusive of any prior communication between the Smartphone and any gaming network in the gaming facility and accomplished exclusive of any requirement for communication between the electronic gaming machine and the gaming network for player tracking purposes, wherein the short range, wireless communication link utilizes a Bluetooth communication protocol;
maintaining the short range, wireless communication link directly between the gaming machine and the Smartphone, wherein the communication link provides a conduit for gaming instructions between the Smartphone and the gaming machine;
utilizing the gaming controller application to provide instructions to the gaming machine to play a game thereon; and
at least one of the following steps:
(a) displaying an output of the gaming machine on a display of the gaming machine and the output of the gaming machine on the Smartphone at a same time, and
(b) replicating a gaming display image of the gaming machine on a display of the gaming machine and the output of the gaming machine on the Smartphone at a same time.

10. The method using a gaming machine controller application as recited in claim 9, wherein the step of utilizing the gaming controller application to provide instructions to the gaming machine includes a representation of at least a portion of input functions available on the gaming machine.

11. The method using a gaming machine controller application as recited in claim 9, wherein the step of initialing a short range, wireless communication link directly between the gaming machine and the Smartphone includes a step of:
obtaining an associating link code associated with the respective gaming machine.

12. The method using a gaming machine controller application as recited in claim 9, wherein the step of initializing a short range, wireless communication link directly between the gaming machine and the Smartphone includes steps of:
generating an associating link code associated with the respective gaming machine;
displaying the generated associating link code associated with the respective gaming machine on a display on or proximate the gaming machine; and obtaining the generated associating link code associated with the respective gaming machine.

13. The method using a gaming machine controller application as recited in claim 9, wherein the step of initializing a short range, wireless communication link directly between the gaming machine and the Smartphone further includes steps of:
   obtaining an associating link code associated with the respective gaming machine by scanning a machine readable representation of the associating link code.

14. The method using a gaming machine controller application as recited in claim 9, wherein the step of initializing a short range, wireless communication link directly between the gaming machine and the Smartphone further includes steps of:
   obtaining an associating link code associated with the respective gaming machine by scanning a machine readable representation of the associating link code, wherein the machine readable representation of the associating link code includes an embedded link to at least one of a website and an application.

15. The method using a gaming machine controller application as recited in claim 9, further comprising a step of:
   modifying a configuration of a game played on the gaming machine upon establishment of the short range, wireless communication link between a gaming machine and the Smartphone.

16. The method using a gaming machine controller application as recited in claim 9, further comprising steps of:
   providing a profile to the gaming machine; and
   modifying a configuration of a game played on the gaming machine upon establishment of the short range, wireless communication link between a gaming machine and the Smartphone, wherein the modifications are based upon the provided profile.

17. The method using a gaming machine controller application as recited in claim 1, further comprising a step of:
   obtaining a user input from motion of the Smartphone to provide user input into the game played on the gaming machine.

18. The method using a gaming machine controller application as recited in claim 9, further comprising a step of:
   obtaining a user input from motion of the Smartphone to provide user input into the game played on the gaming machine.

19. A method using a gaming machine controller application, the method comprising steps of:
   installing the gaming controller application onto a portable computing device, the portable computing device comprising a motion input device;
   activating the gaming controller application;
   initializing a short range, wireless communication link directly between a gaming machine and the portable computing device, wherein the initialized short range, wireless communication link directly between the gaming machine and the portable computing device is initialized by a player using the portable computing device, wherein the initialized short range, wireless communication link directly between the gaming machine and the portable computing device is a first time any communication link between the gaming machine and the portable computing device is established, exclusive of any prior communication between the portable computing device and any gaming network in the gaming facility and accomplished exclusive of any requirement for communication between the electronic gaming machine and the gaming network for player tracking purposes, wherein the short range, wireless communication link utilizes a Bluetooth communication protocol;
   maintaining the short range, wireless communication link directly between the gaming machine and the portable computing device, wherein the communication link provides a conduit for gaming instructions between the portable computing device and the gaming machine; and
   utilizing the gaming controller application to provide instructions to the gaming machine to play a game thereon by obtaining a user input from motion of the portable computing device to provide user input into the game played on the gaming machine.

20. The method using a gaming machine controller application as recited in claim 19, wherein the step of initialing a short range, wireless communication link directly between the gaming machine and the Smartphone includes steps of:
   obtaining an associating link code associated with the respective gaming machine.

21. The method using a gaming machine controller application as recited in claim 19, wherein the step of initializing a short range, wireless communication link directly between the gaming machine and the portable computing device includes steps of:
   generating an associating link code associated with the respective gaming machine;
   displaying the generated associating link code associated with the respective gaming machine on a display on or proximate the gaming machine; and
   obtaining the generated associating link code associated with the respective gaming machine.

22. The method using a gaming machine controller application as recited in claim 19, wherein the step of initializing a short range, wireless communication link directly between the gaming machine and the Smartphone further includes steps of:
   obtaining an associating link code associated with the respective gaming machine by scanning a machine readable representation of the associating link code.

23. The method using a gaming machine controller application as recited in claim 19, wherein the step of initializing a short range, wireless communication link directly between the gaming machine and the portable computing device further includes steps of:
   obtaining an associating link code associated with the respective gaming machine by scanning a machine readable representation of the associating link code, wherein the machine readable representation of the associating link code includes an embedded link to at least one of a website and an application.

24. The method using a gaming machine controller application as recited in claim 19, further comprising a step of:
   modifying a configuration of a game played on the gaming machine upon establishment of the short range, wireless communication link between a gaming machine and the Smartphone.

25. The method using a gaming machine controller application as recited in claim 19, further comprising steps of:
   providing a profile to the gaming machine; and
   modifying a configuration of a game played on the gaming machine upon establishment of the short range, wireless communication link between a gaming machine and the Smartphone, wherein the modifications are based upon the provided profile.

* * * * *